Figure 1:
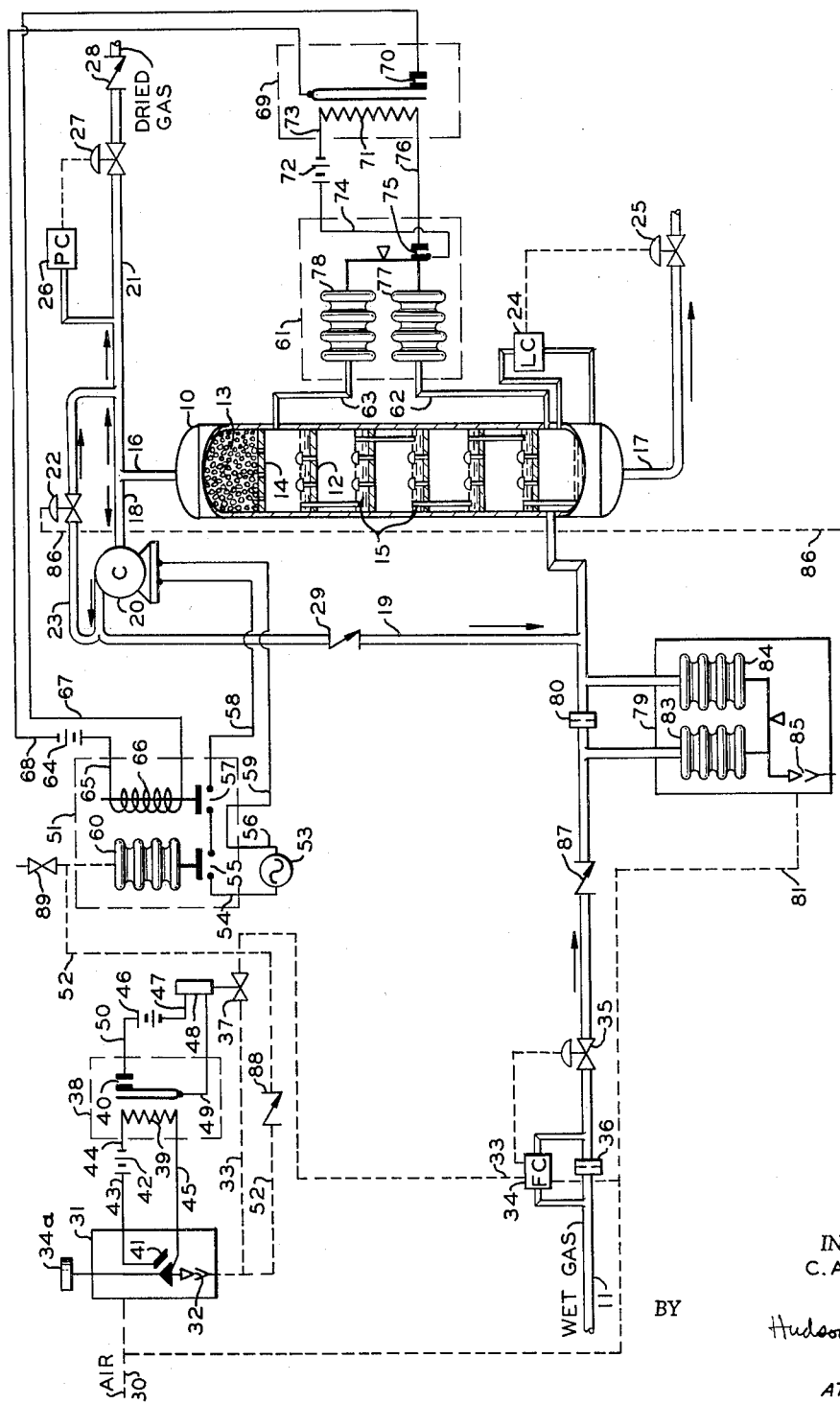

Aug. 8, 1961

C. A. MAURER 2,995,203

PROCESS AND APPARATUS FOR REMOVING MOISTURE FROM GASES

Filed Sept. 8, 1958

2 Sheets-Sheet 1

INVENTOR.
C. A. MAURER

BY

Hudson & Young

ATTORNEYS

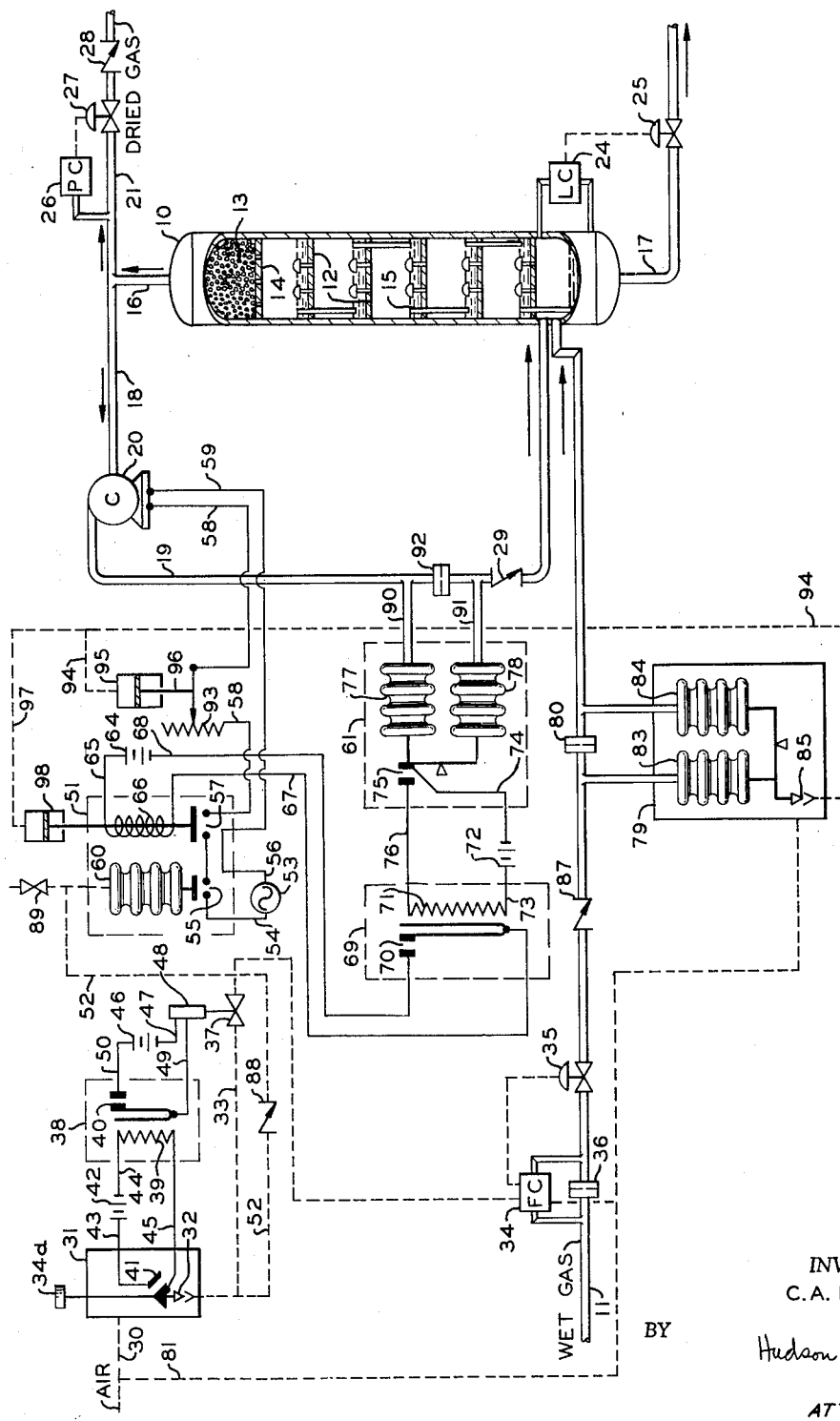

United States Patent Office 2,995,203
Patented Aug. 8, 1961

2,995,203
PROCESS AND APPARATUS FOR REMOVING MOISTURE FROM GASES
Charles A. Maurer, Sweeny, Tex., assignor to Phillips Petroleum Company, a corporation of Delaware
Filed Sept. 8, 1958, Ser. No. 759,517
18 Claims. (Cl. 183—4.1)

This invention relates to processes for removing moisture from gaseous streams containing the same. In one aspect, this invention relates to a method for operating vapor drying columns to obtain efficient drying of gaseous streams containing moisture. In another aspect, this invention relates to control systems for regulating vapor drying columns wherein moisture is removed from gaseous streams containing the same. In another aspect, this invention relates to a vapor drying column apparatus and control systems therefor.

Many hydrocarbon streams obtained in petroleum refining operations contain minor amounts of water which are detrimental in the further utilization of the hydrocarbon stream. Moisture in such streams has conventionally been removed by contacting the stream with a drying agent or a desiccant material which absorbs or dissolves the moisture from the gaseous stream. A preferred apparatus for drying gaseous streams employs two drying steps in which the wet gas is first contacted with a liquid desiccant to remove the major portion of the moisture and then with a solid desiccant to complete the moisture removal. In such apparatus, calcium chloride in liquid form is very often used as the liquid desiccant and calcium chloride in solid form is used as the solid desiccant so that the solution formed in the removal of moisture with the solid desiccant can be used in the liquid form as the liquid desiccant. In general, liquid desiccants are very effective in removing moisture from gaseous streams; however, sometimes the moisture removal is not as complete as desired and, when a solid desiccant is used following the liquid desiccant, excessive loss of the solid desiccant results from contacting the partially dried gas with the solid desiccant.

I have discovered that efficient removal of moisture from gaseous streams can be obtained in liquid desiccant processes by maintaining the flow of wet gas through the drier tower containing the liquid desiccant above a minimum value.

An object of this invention is to provide a method for operating drier apparatus at an optimum rate in order to obtain maximum drying efficiency.

Another object of this invention is to provide a method for operating combination liquid-solid desiccant type drier columns to reduce the consumption of solid desiccant therein.

Another object of this invention is to provide a control system for drier columns containing liquid desiccant wherein at least a minimum flow of gas through said drier columns is maintained.

Another object of this invention is to provide a control system for drier columns wherein an optimum flow of vapor through said columns is maintained.

Other aspects, objects and advantages of the invention are apparent from a consideration of the accompanying disclosure, drawings and the appended claims.

In accordance with the invention, there is provided a method of operating a drier column containing liquid desiccant wherein a portion of the vapor effluent from said drier column is recycled into said column to maintain at least a minimum total flow of vapor through said column and, when the flow of wet vapor to said column is sufficient, to maintain a total flow of vapor through said column within an optimum range. When conducting the drying process in this manner, good vapor-liquid contact is secured by providing sufficient agitation and mixing of the vapor and liquid desiccant on each tray or contact device in the drier column to permit vapor-liquid equilibrium to be approached on each tray.

Also, in accordance with the invention, there is provided a control system for a drier column containing liquid desiccant whereby the flow of wet vapor to said column is measured and vapor effluent of reduced moisture content is recycled into said column in response to said measured flow to maintain at least a minimum flow of total vapor through said column and, when the flow of wet vapor is sufficient, to maintain a flow of total vapor through said column in an optimum range.

In the drawings, FIGURE 1 is a flow diagram of one embodiment of the invention where the recycled vapor effluent is admixed with the wet vapor before introduction into the drier column, the flow of recycle vapor is regulated through bypassing a portion of the recycled stream around the compressor, and the compressor is regulated in response to the pressure difference across the drier column.

FIGURE 2 is a flow diagram of another embodiment of the invention where the recycled vapor effluent is introduced directly into the drier column, the flow of recycle is regulated by varying the output of the compressor in the recycle conduit, and the compressor is regulated in response to the flow of recycled vapor effluent.

Referring to FIGURE 1 of the drawings, wet gas is introduced into drier column 10 through inlet conduit 11 near the lower end of drier 10. A plurality of bubble cap trays are located within column 10 and a quantity of solid desiccant 13 is supported in the upper portion of column 10 by screen grid 14. A layer of liquid desiccant 15 is maintained on each of bubble cap trays 12. Vapor effluent of reduced moisture content is withdrawn from column 10 through outlet conduit 16 and spent liquid desiccant 15 is withdrawn from the bottom of column 10 through conduit 17.

A portion of the vapor effluent of reduced moisture content is recycled into column 10 through conduits 18 and 19 with conduit 19 intersecting conduit 11 at a point removed from column 10. Constant speed compressor 20 is located in conduit 18 to effect the recycling of vapor effluent from the top of column 10 into inlet conduit 11 located at the bottom of column 10. The remaining portion of vapor effluent from the top of column 10 is removed from the process by conduit 21 which is connected to conduits 16 and 18. The flow of recycled vapor effluent is controlled by control valve 22 located in conduit 23 which is connected at one end to conduit 21 and at the other end to the juncture of conduits 19 and 18.

Liquid level controller 24 maintains the desired level of liquid desiccant 15 in the bottom of tower 10 by adjusting the positioning of control valve 25 located in conduit 17. Pressure controller 26 maintains constant pressure in vapor effluent conduit 16 by adjusting the positioning of control valve 27 located in conduit 21. Check valve 28 in conduit 21 prevents flow into the top of column 10 and check valve 29 located in conduit 19 prevents the flow of wet vapor into recycle conduits 18 and 19.

Air for the various control devices to be described hereinafter is obtained from air line 30 which is connected to air valve 31 having valve element 32 adapted to be inserted and removed from air line 33 by the movement of handle 34a forming a part of valve 31. The other end of air line 33 is connected to rate of flow controller 34 which regulates the flow of wet vapor through conduit 11 by adjusting the positioning of valve 35 located in conduit 11 in accordance with the pressure drop developed across flow restriction 36. The flow of air through air line 33 to rate of flow controller 34 is actuated by air valve 37 which is normally closed. Time delay 38, comprising heater 39 and bi-metallic switch 40, prevents the immediate opening of air valve 37 when air valve 31 is first opened in order to permit compressor 20 to be started up and to establish a recycle flow through column 10 in a manner to be described hereinafter. Normally open switch 41 mounted in air valve 31 closes the circuit which permits the flow of electrical current from source 42 to heater 39 through electrical wires 43, 44 and 45. The closing of normally open bi-metallic switch 40 permits the flow of electrical current from source 46 through electrical wire 47, solenoid 48 and electrical wires 49 and 50. The flow of current through solenoid 48 opens air valve 37 to supply air to rate of flow controller 34 through air line 33 in accordance with the positioning of valve element 32 of air valve 31. Thus, air valve 31 controls the rate at which wet gas is introduced into column 10 but wet gas is introduced into column 10 only if compressor 20 is operating and recycling vapor effluent into column 10.

The operation of compressor 20 is controlled by compressor controller 51 to which air is passed immediately through air line 52 upon the opening of air valve 31. Electrical energy is supplied to compressor 20 from electrical source 53 through electrical wire 54, bellows switch 55, electrical wire 56, solenoid switch 57, electrical wire 58 and electrical wire 59.

Bellows switch 55 is normally open and the introduction of air into bellows 60 through conduit 52 effects application of electrical energy to compressor 40 through normally closed solenoid switch 57.

The opening of solenoid switch 57 is determined by pressure differential controller 61 which is connected to the bottom of column 10 by conduit 62 and the top of column 10 by conduit 63. Electrical source 64 supplies current through wire 65 to solenoid 66 of solenoid switch 57 with electrical wires 67 and 68 and time delay 69 completing the circuit. Time delay 69 comprises bi-metallic switch 70, which is normally open, and heater 71. Electrical energy is supplied from source 72 through wire 73 and wire 74, switch 75 in pressure differential controller 61, and wire 76. Switch 75 is normally open and is closed by the movement of bellows 77 and 78 in pressure differential controller 61, whenever the pressure differential across column 10 corresponds to a flow of vapor through column 10 equal to the maximum flow permitted through the column. Thus, solenoid switch 57 is open only when switch 75 in pressure differential controller 61 is closed by a pressure differential corresponding to maximum flow being developed within column 10 with time delay 69 preventing intermittent fluctuations in pressure difference from operating solenoid switch 57 in an intermittent manner.

The flow of recycled vapor effluent is controlled by flow controller 79 which is responsive to the pressure differential developed across flow restriction 80 located in conduit 11 at a point upstream from the intersection of recycle conduit 19 with conduit 11. Air is supplied to flow controller 79 through air line 81 which is connected to air supply line 30. The difference in pressure developed across flow restriction 80 operates through bellows 83 and 84 in flow controller 79 to adjust the positioning of valve 85 which controls the amount of air passed through air line 86 to control valve 22 located in by-pass conduit 23. Check valve 87 is provided in conduit 11 to prevent the flow of recycled vapor effluent into conduit 11.

In operation, the opening of air valve 31 immediately supplies air against one side of air control valve 37 which is normally closed. After the time delay imposed by time delay 38 has occurred, air valve 37 is opened and air is supplied to rate of flow controller 34 acting to pneumatically set flow controller 34 to the desired flow demand to effect opening of control valve 35 and supply wet vapor to column 10 to be dried. The opening of air valve 31 also supplies air immediately to compressor controller 51 which immediately starts up compressor 20 to recycle the gas contained within column 10 through conduits 16, 18 and 19 into column 10 to maintain a minimum flow within column 10. Time delay 38 is so adjusted that valve 35 is not opened until the minimum flow of vapor, as recycle, has been established in column 10.

For further description of the operation of this invention, it is necessary to assume some flow values for the process. Thus, it will be assumed that the minimum flow of vapor permitted in column 10 for efficient drying is 24,000 pounds of vapor per hour and that the maximum flow permitted is 35,000 pounds per hour. Constant flow compressor 20 circulates vapor effluent at the minimum rate of 24,000 pounds per hour. It is further assumed that the optimum flow of vapor within column 10 is within the range of from 30,000 to 31,000 pounds per hour. With these assumptions, a flow of wet vapor, amounting to 3,000 pounds per hour through conduit 11 is detected by flow controller 79 but this flow is insufficient to effect the adjustment of control valve 22 since the total flow of wet vapor and recycled effluent is 27,000 pounds per hour and less than the optimum flow of 30,000 pounds per hour. Hence valve 22 remains closed and the total flow from compressor 20 is recycled through conduit 19. If the flow of wet vapor through conduit 11 is increased to 10,000 pounds per hour, flow controller 79 operates to partially open control valve 22 and bypass a portion of the compressed vapor effluent flowing from conduit 18 through conduit 23 into product line 21 and thereby reduce the flow of recycled vapor effluent flowing through conduit 19 to 20,000 pounds per hour. Thus, the 10,000 pounds per hour of wet vapor feed and the 20,000 pounds per hour of recycled vapor effluent gives a total vapor flow within column 10 of 30,000 pounds per hour which is within the optimum range. If the flow of wet vapor in conduit 11 is increased to 30,000 pounds per hour, which is a value within the optimum range, flow controller 79 operates to fully open by-pass valve 22 and stop the recycle of vapor effluent through conduit 19. Also, pressure differential controller 61 will operate if the total flow within column 10 builds up or is increased to 31,000 pounds per hour which is the upper limit of the optimum range. Thus, when the pressure difference across column 10 is sufficient to correspond to a total vapor flow of 31,000 pounds per hour, normally open switch 75 in pressure differential controller 61 is closed and normally open bi-metallic switch 70 in time delay 69 is closed after a suitable interval of time has passed to apply a voltage across solenoid 66 and solenoid switch 57 to open switch 57 and stop compressor 20. Time delay 69 prevents periodic fluctuations of pressure difference from intermittently stopping the operation of compressor 20.

When the flow of gas to be dried is cut off by closing air valve 31, the source of air to compressor controller 51 is withdrawn. However, during operations when compressor 20 is operating (less than 31,000 pounds per hour of flow through line 11) and while, of course, switch 57 is closed, the voltage to compressor 20 is not cut off immediately but continues to be applied until the air trapped in bellows 60 by check valve 88 in air line 52 has leaked sufficiently through bleed 89 for bellows switch 55 to be opened. By this method of operation, the flow of vapor within column 10 is always maintained above a minimum value.

In FIGURE 2 of the drawings, where similar elements in FIGURE 1 are identified with the same reference characters as used in FIGURE 1, recycle conduit 19 is returned directly to drier column 10 instead of forming a juncture with conduit 11 as in FIGURE 1.

Also, in FIGURE 2, pressure differential controller 61 is connected by conduits 90 and 91 across flow restriction 92 located in recycle conduit 19 downstream from compressor 20 to control the starting and stopping of compressor 20. Time delay 69 is connected to pressure differential controller 61 and solenoid 66 of compressor controller 51 in the same manner as is shown in FIGURE 1. In addition, variable resistance 93 is located in electrical wire 58 with the variable contact connected to flow controller 79 through air line 94, transducer 92 and mechanical linkage 96. Also, flow controller 79 is connected through air lines 94 and 97 to transducer 98 which is mechanically linked to solenoid switch 57.

In operation of the embodiment of FIGURE 2, a flow of wet vapor of 30,000 pounds per hour, the lower limit of the optimum range, results in the operation of flow controller 79 to reduce the voltage applied to compressor 20 by movement of the variable contact of variable resistance 93 to reduce the capacity of compressor 20 to approximately zero so that no vapor effluent is recycled to column 10 through conduit 19. In addition, the approximately zero flow of vapor in conduit 19 is detected by differential pressure controller 61 which operates, after suitable time delay imposed by time delay 69 to apply a voltage from source 64 to solenoid 66 in compressor controller 51 to open solenoid switch 57 and open the electrical circuit by which voltage is applied from source 53 to compressor 20. Pressure differential controller 61 operates only when vapor flow in conduit 19 approaches zero flow so that flows between zero and the minimum flow within column 10 can be obtained through recycle conduit 19. If the flow of wet vapor to column 10 is maintained at some value where a recycle flow of less than the minimum value is necessary to maintain minimum flow within column 10, such as a wet vapor flow of 10,000 pounds per hour as used in the description of FIGURE 1, the flow of wet vapor is measured by flow controller 79 which operates to adjust variable resistance 93 to vary output of compressor 20 to reduce the flow of vapor effluent in conduit 19 to a value of 20,000 pounds per hour to provide a total flow in column 10 of 30,000 pounds per hour which is within the optimum range.

Although two distinct embodiments of this invention are shown in the drawings, it will readily be apparent to one skilled in the art that other embodiments of the invention can be devised from the elements of the invention as above described. For example, pressure differential controller 61 can be connected across column 10 in the embodiment of FIGURE 2 in order to control compressor 20 in the manner as described with respect to the embodiment of FIGURE 1. Also, variable resistance 93 can be used in combination with variable capacity compressor 20 in place of by-pass conduit 23 and fixed capacity compressor 20 to control the flow of recycled vapor effluent. Further, recycle conduit 19 in the embodiment of FIGURE 1 can be returned directly to column 10, as shown in FIGURE 2, instead of being connected to conduit 11. If desired, flow resistance 80 can be inserted in conduit 11 in FIGURE 1 at a point downstream from the juncture of conduits 11 and 19. Of course, in this last modification, the operation of flow controller 79 will have to be changed since the total flow of wet vapor and recycled vapor will be measured.

As will be readily apparent to those skilled in the art, the invention is not limited to drying columns in which both liquid and solid desiccants or drying agents are employed. If desired, the solid desiccant need not be used and the drying column can be filled with only liquid desiccant.

The operation of this invention is not limited by the type of desiccants used in the drying column and it is only necessary that one of the desiccants be in liquid form. Preferably, the liquid desiccant is calcium chloride in aqueous solution; however, aqueous solutions of other hygroscopic salts, such as calcium bromide, zinc chloride, and lithium bromide, can be employed. Preferably, when a solid desiccant is also used, the solid desiccant is the same as the liquid desiccant; however, different solid desiccants can also be used. Also, other materials such as activated alumina, bauxite, and molecule sieves can be used as the solid desiccant.

Drying column 10 can be constructed with any suitable vapor-liquid contact devices such as bubble cap trays, plate type trays, and grid type trays. The pressure maintained within the drying column depends upon the particular drying agents used but the pressure will ordinarily be within the range of 800 to 2,000 p.s.i. The temperature maintained within the drying column will also depend upon the particular drying agents used, but the temperature will ordinarily be within the range of from 35 to 150° F.

The minimum total flow of vapor required within the drying column to effect efficient contact between the liquid desiccant and the vapor being dried depends upon the dimensions of the column, its construction, and the particular desiccants employed. This flow can be readily determined by one skilled in the art in possession of this disclosure. In a drying column of 15.0 feet in length and 2.5 feet in diameter, using five bubble cap trays as liquid-vapor contact devices, and maintaining a three inch layer of aqueous calcium chloride on each tray, it has been found that the minimum flow of vapor within the column should be at least 24,000 pounds per hour and that the optimum flow is from 30,000 to 31,000 pounds of vapor per hour.

*Example*

The drying column of FIGURE 1 was constructed with a height of 15.0 feet, a diameter of 2.5 feet and five bubble cap trays. Solid calcium chloride was used as the solid desiccant and a three inch layer of aqueous calcium chloride was maintained on each tray as liquid desiccant. The bed of solid calcium chloride desiccant was four feet in thickness. The drying steps were conducted at a pressure of 1200 p.s.i. and a temperature of 110° F. Ethylene containing 0.13 weight percent moisture, which varied from 0.10 to 0.15 weight percent, was dried in the column to obtain a vapor effluent containing about 0.01 weight percent moisture using the control system of the embodiment shown in FIGURE 1.

Reasonable variation and modification are possible within the scope of the foregoing disclosure, drawings and the appended claims to the invention, the essence of which is that there have been provided: first, an improved method for operating a drier column containing liquid desiccant wherein a portion of the vapor effluent from said drier column is recycled into said column to maintain at least a minimum total flow of vapor through said column, and second, a control system in association with said drier column to measure the flow of wet vapor to said column and to control the flow of recycled vapor effluent into said column in response to said measured flow to maintain said minimum flow and, when the flow of wet vapor is sufficient, to maintain a flow of total vapor through said column in an optimum range.

I claim:

1. In a process wherein a vapor feed stream is contacted with desiccant material comprising a liquid in a drying column to remove moisture therefrom and produce a vapor effluent stream of reduced moisture content, the improvement comprising compressing a portion of said vapor effluent stream of said reduced moisture content to an elevated pressure, recycling at least a portion of the resulting compressed vapor effluent stream of said reduced moisture content to said drying column, measuring the flow of vapor to said drying column, controlling the recycle of said compressed vapor effluent stream of said reduced moisture content to said drying column in response to variations in said measured flow to maintain the total flow of vapor into said column above a minimum value, and recovering the remaining portion of said vapor effluent stream of said reduced moisture content as product of the process.

2. The improvement of claim 1 wherein said step of controlling the recycle of said portion of vapor effluent stream of said reduced moisture content into said drying column comprises the steps of passing a portion of said compressed vapor effluent stream into the vapor effluent stream recovered from said drying column and regulating the flow of said last-mentioned portion of said compressed vapor effluent stream of said reduced moisture content in response to said measured flow.

3. The improvement of claim 1 wherein said step of controlling the recycle of said portion of vapor effluent stream of said reduced moisture content into said drying column comprises the step of regulating the degree of compression in said compression step in response to said measured flow.

4. The improvement of claim 1 wherein said portion of vapor effluent stream of said reduced moisture content recycled is admixed with said vapor feed stream prior to introduction into said drying column.

5. The improvement of claim 4 wherein the flow of said vapor to said drying column is measured at a point upstream from the point of admixture of said vapor feed stream with said recycled portion of vapor effluent stream of said reduced moisture content.

6. The improvement of claim 4 wherein the flow of said vapor to said drying column is measured at a point downstream from the point of admixture of said vapor feed stream with said recycled portion of vapor effluent stream of said reduced moisture content.

7. In a process wherein a vapor feed stream is contacted with desiccant material comprising a liquid in a drying column to remove moisture therefrom and produce a vapor effluent stream of reduced moisture content, the improvement comprising recycling a portion of said vapor effluent stream of said reduced moisture content into said drying column, measuring the rate of flow of vapor to said drying column, adjusting the recycle of said vapor effluent stream of said reduced moisture content to said drying column in response to said measured rate of flow to maintain at least a minimum flow of vapor through said drying column, further adjusting the recycle of said vapor effluent stream of said reduced moisture content to said drying column in response to said measured rate of flow to maintain a flow of vapor through said drying column within an optimum range, and recovering the remaining portion of said vapor effluent stream of said reduced moisture content as product of the process.

8. In a process wherein a vapor feed stream is contacted with desiccant material comprising a liquid in a drying column to remove moisture therefrom and produce a vapor effluent stream of reduced moisture content, the improvement comprising compressing a portion of said vapor effluent stream of said reduced moisture content to an elevated pressure, recycling at least a first portion of the resulting compressed vapor effluent stream of said reduced moisture content to said drying column, measuring the flow of vapor to said drying column, controlling the recycle of said compressed vapor effluent stream of reduced moisture content to said drying column in response to said measured flow of vapor to said drying column to maintain a flow of vapor within said drying column within an optimum range, and recovering the remaining portion of said vapor effluent stream of said reduced moisture content as product of the process.

9. The improvement of claim 8 wherein the recycle of a portion of said vapor effluent stream of said reduced moisture content to said drying column is discontinued at a rate of flow of vapor into said drying column greater than said optimum range.

10. The improvement of claim 8 comprising the steps of measuring the difference in pressure at two spaced points within said drying column and controlling said compressing of said first portion of said vapor effluent in response to variations in the measured pressure difference in said drying column to maintain the vapor flow within said optimum range.

11. The improvement of claim 8 comprising the steps of measuring the flow of vapor effluent stream of said reduced moisture content recycled to said drying column and discontinuing said compressing of said first portion of said vapor effluent stream of said reduced moisture content when said measured flow of vapor effluent recycled approaches zero flow.

12. Apparatus for removing moisture from vapor feed streams comprising a drying column containing a drying agent comprising a liquid, inlet conduit means for introducing said vapor feed into said drying column, outlet conduit means for withdrawing vapor effluent having reduced moisture content from said drying column, recycle conduit means for recycling a portion of said vapor effluent into said drying column, measuring means for determining the rate of flow of vapor into said inlet conduit means, and flow control means responsive to said measuring means for regulating the flow of said vapor effluent recycled into said drying column to maintain at least a minimum total flow of vapor into said drying column.

13. Apparatus for removing moisture from a vapor feed stream comprising a drying column containing a drying agent comprising a liquid, inlet conduit means for introducing said vapor feed into said drying column, outlet conduit means for withdrawing vapor effluent having reduced moisture content from said drying column, recycle conduit means for recycling a portion of said vapor effluent into said drying column, compression means in said recycle conduit means, by-pass conduit means for by-passing flow of compressed vapor effluent to said outlet conduit means, control valve means in said by-pass conduit means for regulating the flow of said vapor effluent in said recycle conduit means, measuring means in said inlet conduit means for determining the flow of vapor in said inlet conduit means, and flow control means responsive to said measuring means for adjusting said control valve means to regulate the flow of said vapor effluent recycled into said drying column and thereby maintain at least a minimum total flow of vapor into said drying column.

14. The apparatus of claim 13 wherein said recycle conduit means is in open communication with said inlet conduit means at a point upstream from the location of said measuring means in said inlet conduit means.

15. The apparatus of claim 13 wherein said recycle conduit means is in open communication with said inlet conduit means at a point downstream from the location of said measuring means in said inlet conduit means.

16. The apparatus of claim 13 wherein said recycle conduit means is in direct open communication with said drying column.

17. The apparatus of claim 13 wherein a second measuring means determines the difference in pressure between two spaced points in said drying column, and control means responsive to said second measuring means to regulate said compression means in response to variations in said measured pressure difference in said drying column to maintain said vapor flow within the optimum range.

18. The apparatus of claim 12 wherein a second measuring means determines the flow of vapor effluent in said recycle conduit means, and control means responsive to said second measuring means to discontinue the operation of said compression means when said measured flow of vapor effluent in said recycle conduit means approaches zero flow.

References Cited in the file of this patent
UNITED STATES PATENTS

| | | |
|---|---|---|
| 1,749,763 | Fleisher | Mar. 11, 1930 |
| 2,881,118 | Spann et al. | Apr. 7, 1959 |
| 2,899,013 | Carter | Aug. 11, 1959 |